Nov. 17, 1925.

F. S. MORRIS

DISH AND COVER

Filed Jan. 10, 1922

1,561,943

INVENTOR.
Frederick S. Morris.
BY Morsell & Keeney.
ATTORNEYS.

Patented Nov. 17, 1925.

1,561,943

UNITED STATES PATENT OFFICE.

FREDERICK S. MORRIS, OF SHEBOYGAN, WISCONSIN, ASSIGNOR TO THE VOLLRATH CO., OF SHEBOYGAN, WISCONSIN, A CORPORATION OF WISCONSIN.

DISH AND COVER.

Application filed January 10, 1922. Serial No. 528,225. REISSUED

*To all whom it may concern:*

Be it known that I, FREDERICK S. MORRIS, a citizen of the United States, and resident of Sheboygan, in the county of Sheboygan and State of Wisconsin, have invented new and useful Improvements in Dishes and Covers, of which the following is a description, reference being had to the accompanying drawings, which are a part of this specification.

This invention relates to improvements in dishes and covers, more particularly, although not solely, adapted for refrigerator use. Seamless drawn steel enameled dishes and covers of various round and oval shapes now in every day use are objectionable due to the fact that considerable space is lost when a number of dishes and their covers are placed on a shelf and more particularly refrigerator shelves in which the storage space is very limited and it is desirable in home refrigerators to accommodate a considerable number of different dishes. It is also desirable to eliminate seams and joints in dishes and covers adapted to hold food for any length of time due to the fact that it is extremely difficult to completely clean seams and joints and the food lodged therein will soon contaminate other food placed in the dish or resting on the cover.

It is one of the objects of the present invention to overcome the before mentioned objectionable features and provide a dish and cover of approximately square shape which are entirely free from joints or seams and which will permit the placing of the greatest number of dishes and their covers in a limited area to occupy a minimum amount of space.

A further object of the invention is to provide a dish of square seamless form in horizontal section and having slightly rounded corners and tapered side portions to permit nesting of a plurality of the dishes together.

A further object of the invention is to provide a dish of square formation having comparatively deep tapered side portions and outwardly and downwardly extending upper edge portions.

A further object of the invention is to provide a dish cover of square formation shaped to snugly fit its dish and permit the placing of other dishes on top of the cover, and furthermore to provide a dish cover which may also be used as a dish itself either side up.

A further object of the invention is to provide a dish and cover of square seamless formation which are of simple construction, are strong and durable and are well adapted for the purpose described.

With the above and other objects in view the invention consists of the improved dish and cover and their parts and combinations as set forth in the claims, and all equivalents thereof.

In the accompanying drawing in which the same reference characters indicate the same parts in all of the views.

Figure 1:
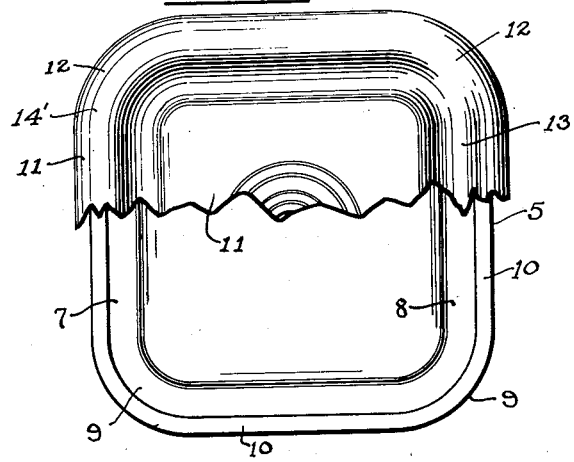
Fig. 1 is a top view of the improved dish and a portion of the cover.

Referring to the drawing, the numeral 5 indicates a dish preferably formed of sheet metal 6, covered both inside and out with an enameled coat 7 baked thereon. The dish is of approximately square or rectangular shape in horizontal section and is formed with tapered side portions 8 and slightly rounded corners 9 to permit convenient nesting of the dishes and to eliminate sharp corners in which food might lodge. The upper edge portions of the sides curve outwardly and downwardly to form flanges 10 which reinforce and give an ornate appearance to the dish. Particular attention is directed to the fact that the dish is of one piece construction and that the corner portions are entirely free from seams or joints so that smooth interior and exterior surfaces are provided thus forming a sanitary dish very desirable for holding food.

Figure 2:
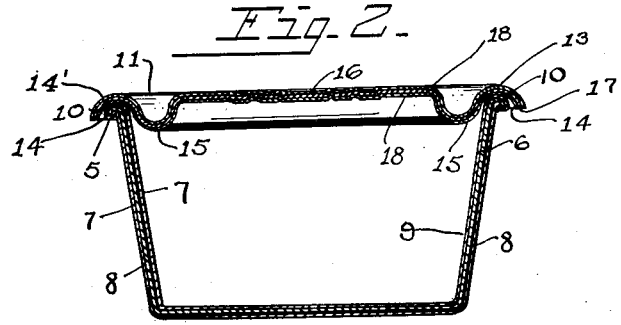
Fig. 2 is a transverse sectional view thereof.
Figure 3:
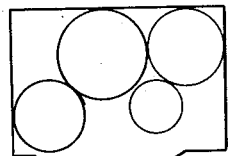
Fig. 3 is a diagrammatic top view of a refrigerator showing a number of round dishes of ordinary construction therein.
Figure 4:
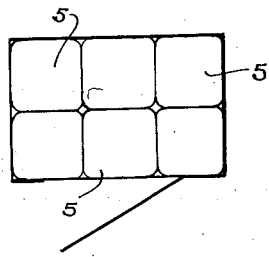
Fig. 4 is a similar view showing the greater number of the improved square dishes which may be accommodated in the space of the same size.
Figure 5:
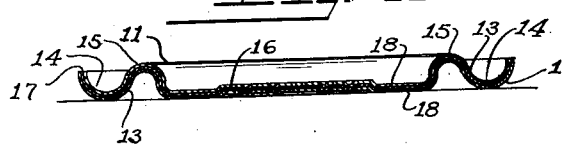
Fig. 5 is a sectional view of the cover shown in inverted position when used as a dish.

The cover 11 of the improved dish is also of rectangular shape with rounded corners 12 and is formed with edge corrugations 13 of S-shape in cross section. The outer corrugation is upwardly curved to form a rectangular groove 14 into which the upper edge of the dish extends when the cover is placed thereon, as shown in Fig. 2. The inner corrugation is curved downwardly to form a shoulder 15 which extends into the dish close to the upper edge thereof and prevents said cover from accidentally sliding off the dish, and also permits nesting the covers together. The inner portion 16 of the cover is approximately of flat shape so that when in inverted position as shown in Fig. 5 the cover may be used as a plate or dish, the opposite side portion of the grooved cover part forming a supporting rib 14' for said cover. The said cover is also formed of sheet metal 17 covered on both sides with enamel 18 baked thereon.

From the foregoing description it will be seen that the invention is of very simple construction and that a given area will accommodate a greater number of dishes and their covers of the improved form and of greater capacity than the ordinary dishes and covers now in general use.

What I claim as my invention is:

1. A sheet metal dish and cover of rectangular form in horizontal section and having seamless corner portions being non-folded and formed of single thicknesses of metal, the cover having a rectangular groove on one side to receive the upper edge portions of the dish and being invertible for use on either side.

2. A sheet metal dish and invertible cover of rectangular form in horizontal section and having seamless corner portions formed of single thicknesses of metal, the cover having a rectangular groove on one side to receive the upper edge portions of the dish and a rib on the other side to support the cover when in inverted position, said groove and rib being formed by reverse curves in the metal.

In testimony whereof, I affix my signature.

FREDERICK S. MORRIS.